United States Patent
Ishida et al.

(10) Patent No.: US 8,477,124 B2
(45) Date of Patent: Jul. 2, 2013

(54) SEMICONDUCTOR DEVICE

(75) Inventors: Taku Ishida, Nanae (JP); Kazuhisa Higuchi, Nanae (JP); Shinobu Notomi, Nanae (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 259 days.

(21) Appl. No.: 12/975,393

(22) Filed: Dec. 22, 2010

(65) Prior Publication Data

US 2011/0148827 A1  Jun. 23, 2011

(30) Foreign Application Priority Data

Dec. 22, 2009  (JP) ................................. 2009-290507

(51) Int. Cl.
  *G09G 5/00*  (2006.01)
  *G09G 3/36*  (2006.01)
(52) U.S. Cl.
  USPC ........................................... 345/204; 345/98
(58) Field of Classification Search
  USPC .................... 345/87–104, 204–211; 257/673, 257/737
  See application file for complete search history.

(56) References Cited

U.S. PATENT DOCUMENTS

| | | | |
|---|---|---|---|
| 5,774,106 A | 6/1998 | Nitta et al. | |
| 6,304,241 B1 * | 10/2001 | Udo et al. | 345/96 |
| 2001/0028336 A1 * | 10/2001 | Yamagata et al. | 345/98 |
| 2007/0013634 A1 * | 1/2007 | Saiki et al. | 345/98 |
| 2008/0099894 A1 * | 5/2008 | Yoshioka et al. | 257/673 |
| 2008/0273002 A1 * | 11/2008 | Kim et al. | 345/98 |
| 2009/0160497 A1 * | 6/2009 | Nishimura | 327/108 |
| 2010/0102387 A1 | 4/2010 | Kojima | |

FOREIGN PATENT DOCUMENTS

| | | |
|---|---|---|
| JP | 8-87251 A | 4/1996 |
| JP | 2000-305534 A | 11/2000 |
| JP | 2007-12864 | 1/2007 |
| JP | 2009-004441 A | 1/2009 |

\* cited by examiner

*Primary Examiner* — Hong Zhou
(74) *Attorney, Agent, or Firm* — Miles & Stockbridge P.C.

(57) ABSTRACT

A semiconductor device has an LCD driver formed over a silicon substrate. The LCD driver is arranged in a source output circuit region and includes two or more source output cells for generating data signals and two or more output pads for receiving the data signals and sending them to the outside. The two or more pads are arranged over the silicon substrate along a row direction, and the two or more source output cells are arranged in two rows and N columns along the row direction. A source output cell arranged at an Nth column of a first row is electrically coupled to a (2N−1)th output pad. Also, a source output cell CS1 arranged at the Nth column of a second row is electrically coupled to a (2N)th output pad. The arrangement allows for a reduced chip size.

12 Claims, 12 Drawing Sheets

CS1: SOURCE OUTPUT CELL (OUTPUT CELL)
DRV1: LCD DRIVER (DRIVER LINE)
PD1: OUTPUT PADS (TWO OR MORE PADS, PADS)
RS: SOURCE OUTPUT CIRCUIT REGION (OUTPUT CIRCUIT REGION)
VD: DATA SIGNAL (SOURCE OUTPUT SIGNAL)

US 8,477,124 B2

SEMICONDUCTOR DEVICE

CROSS-REFERENCE TO RELATED APPLICATIONS

The disclosure of Japanese Patent Application No. 2009-290507 filed on Dec. 22, 2009 including the specification, drawings and abstract is incorporated herein by reference in its entirety.

BACKGROUND OF THE INVENTION

The present invention relates to a technique effectively applicable to a semiconductor device which has an LCD driver for driving a liquid crystal display unit (LCD).

As a semiconductor device for driving an LCD which has a large number of pixels arranged in an array in rows and columns, there is used an LCD driver. In general, the LCD driver is arranged in the periphery of a display and has an elongate chip form in a direction of one side.

For example, as a driver IC for a liquid crystal display panel, Japanese Unexamined Patent Publication No. 2009-4441 (Patent Document 1) discloses a configuration where MOSFETs arranged in two or more wells over a semiconductor substrate to achieve high resistance to voltage and electrostatic discharge (ESD).

Also, for example, Japanese Unexamined Patent Publication No. 2007-12864 (Patent Document 2) discloses an electrostatic discharge protection circuit which has two or more deep N-wells to which different voltages are applied.

Further, for example, Japanese Unexamined Patent Publication No. 2000-305534 (Patent Document 3) and Japanese Unexamined Patent Publication No. Hei 8(1996)-87251 (Patent document 4) disclose a drive method for a liquid crystal drive circuit according to a dot inversion drive method.

[Patent Document 1] Japanese Unexamined Patent Publication No. 2009-4441

[Patent Document 2] Japanese Unexamined Patent Publication No. 2007-12864

[Patent Document 3] Japanese Unexamined Patent Publication No. 2000-305534

[Patent Document 4] Japanese Unexamined Patent Publication No. Hei 8(1996)-87251

SUMMARY OF THE INVENTION

The LCD driver which the present inventors have studied in advance includes a signal output circuit which has a function of sending a signal according to the color tone of pixels forming the LCD. The LCD is comprised of a large number of pixels, and the LCD driver has to send a signal corresponding to each of the pixels. Therefore, the signal output circuit has two or more output cells corresponding to respective pixels.

The pixels included in the LCD are arranged in a matrix form. The pixels arranged in the same row are coupled by the same gate line, and the pixels arranged in the same column are coupled by the same source line. Moreover, common signals for comparison are supplied to all the pixels. The signal output circuit of the LCD driver serves as a circuit region for the gate line and the source line, and for sending common signals.

In such a signal output circuit of the LCD driver, having studied particularly the source output circuit for sending source signals, the present inventors found a number of problems.

As described above, when the pixels arranged in the same column are coupled by the same source line, there exist the number of source lines corresponding to the number of columns. Further, in order to send source output signals to respective source lines, the signal output circuit of the LCD driver has source output cells corresponding to the number of source lines. A region where source output cells are arranged over the LCD driver is called a source output circuit region. The source output cells and the source lines corresponding to each other are electrically coupled through a wiring formed by a conventional semiconductor manufacturing process and pads coupled to the wiring. That is, there exist the same number of pads as the number of source lines and source output cells. The pads, which are between the source output cells of the LCD driver and the source lines, are arranged along one side in a row which extends in a direction along a long side of the semiconductor substrate (semiconductor chip, silicon substrate) of the LCD driver. The source output cells corresponding to respective pads are also arranged in a row in the row direction in the source output region.

In addition to the signal output circuit region, the semiconductor chip included in the LCD driver has various circuit regions such as an analog circuit region and a memory region. Further, because of the needs for mounting the LCD itself onto a mobile terminal unit and lower electric consumption, as in the case of other semiconductor chips, miniaturization of the LCD driver is desired. However, the sizes of the source output region and other circuit regions which form the LCD driver are determined by a manufacturing process margin and a manufacturing yield. Therefore, the reduction in size of the regions is limited. Thus, the region in which the source output circuit is arranged is defined by the size of the LCD driver itself and occupation rates of other circuit regions. Further, in order to meet the demand for increasing the number of pixels of the LCD, the size of the source output circuit region in the LCD driver is constrained more severely. With such a technical trend, in the source output circuit region of the LCD driver, it was found by the studies of the present inventors that it would be more difficult for all the source output cells to be arranged in the same row. If it is difficult to arrange the source output cells in the same row, a region in which wirings to the pads are routed is required. Thus, it becomes difficult to reduce the chip size of the LCD driver.

Therefore, an object of the present invention is to provide a technique capable of reducing the chip size of an LCD driver.

A semiconductor device according to one principal aspect of the invention comprises a driver circuit arranged over a semiconductor substrate. The driver circuit comprises an output circuit region, two or more output cells arranged in the output circuit region and generating output signals, and two or more pads receiving the output signals and sending them to the outside. In this regard, the two or more pads are arranged along a row direction of the semiconductor substrate, and the two or more output cells are arranged along the row direction in two rows and N columns. In particular, of the two or more output cells, an output cell arranged at an Nth column of a first row is electrically coupled to a pad, of the two or more pads, arranged at a (2N−1)th position as seen in the row direction. Moreover, of the two or more output cells, an output cell arranged at the Nth column of a second row is electrically coupled to a pad, of the two or more pads, arranged at a (2N)th position as seen in the row direction.

With the foregoing arrangement, the chip size of the LCD driver can be reduced.

The above and other objects, aspects and novel features of the present invention will become apparent from the description of this specification and attached drawings.

DETAILED DESCRIPTION OF THE PREFERRED EMBODIMENTS

Figure 1:
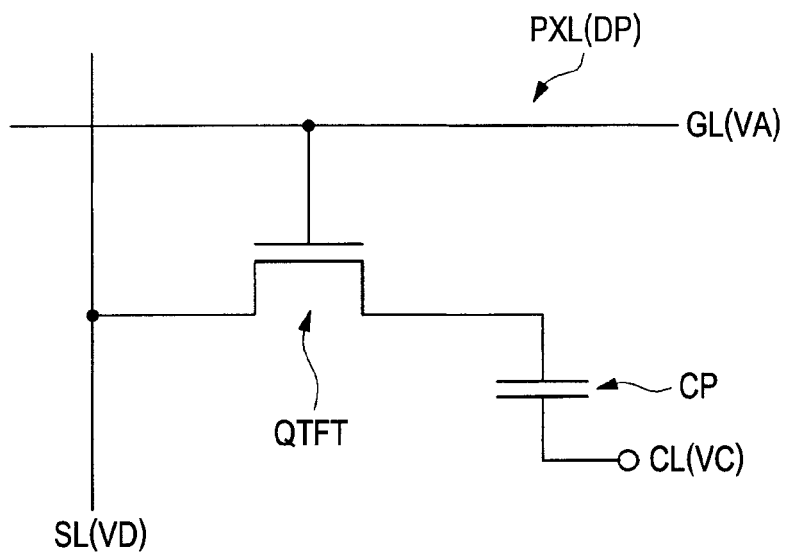
FIG. 1 is a circuit diagram of pixels driven by an LCD driver according to Embodiment 1 of the present invention.

Although embodiments of the invention are illustrated by division into a plurality of sections or sub-embodiments if expediently necessary, these are mutually relevant to one another an applicable together unless otherwise stated or inapplicable in principle. Modifications, details, supplemental explanation and the like of one embodiment can thus be applicable to part or all of others. In the following embodiments, where reference is made to the number and other parameters of elements (including the number, numerical value, quantity, range and the like), this is not be construed as limiting to specific values or numbers, respectively, unless otherwise specified or where limited to a specific value apparently in principle. That is, values smaller or larger than the respective specified values are also within the scope of the invention. Moreover, it is to be understood that constituent elements (including steps) in the following embodiments are not essential unless otherwise specified or where such elements are considered to be apparently essential in principle. Likewise, if reference is made to the shape, position relation and the like of the constituent elements, then substantially similar shapes, position relations, and the like are also within the scope of the invention unless otherwise specified or where such similar characteristics should not be included in principle. This is true of the above-indicated numbers and ranges. Throughout the drawings for illustrating the embodiments of the invention, like reference characters indicate like parts or members having similar functions, and are not repeatedly explained after once having been described. Embodiments of the invention are now described with reference to the accompanying drawings.

Embodiment 1

A detailed explanation will be given of an LCD driver and drive method of a semiconductor device according to Embodiment 1.

A liquid crystal display (liquid crystal display unit, also called an "LCD") is configured by arranging two or more pixels, which are units for displaying pictures and characters, in vertical and horizontal directions. By increasing the number of pixels, curves in an image look smooth, realizing a finer image. Also, when showing a color image, the three primary colors of red (Red: R), green (Green: G), and blue (Blue: B) are combined to form one pixel.

Figure 2:
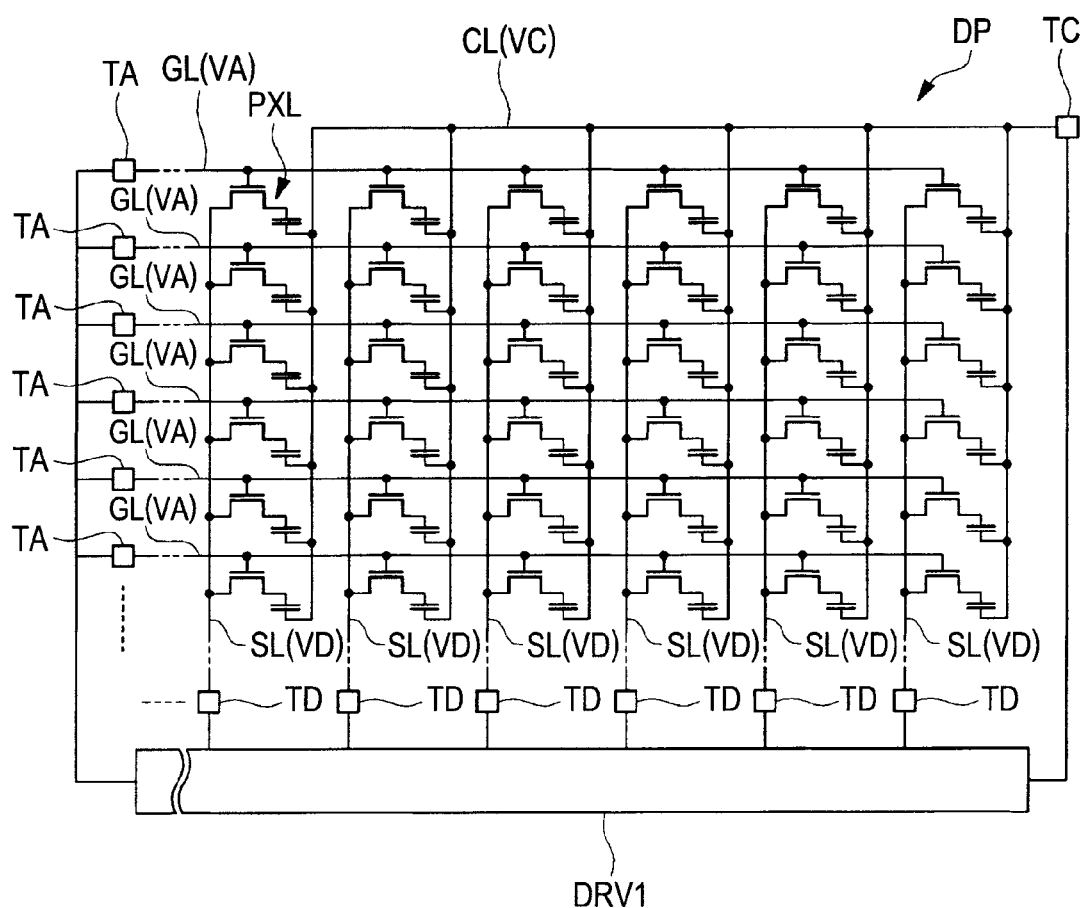
FIG. 2 is an explanatory view showing a state where a liquid crystal display is configured by arranging pixels of FIG. 1 in an array.

FIG. 1 shows a circuit diagram of pixels PXL driven by the LCD driver of Embodiment 1. FIG. 2 is an explanatory view showing a state where the liquid crystal display (liquid crystal display unit) DP is configured by arranging the pixels PXL of FIG. 1 in an array. With reference to FIGS. 1 and 2, an explanation will be given of a configuration of the liquid crystal display DP using a thin film transistor (TFT) QTFT which is used as a switch for an active matrix system being a drive method of pixels.

The liquid crystal display DP comprises liquid crystal source lines SL, liquid crystal gate lines GL, thin film transistors QTFT as switches arranged at crossing portions of the source lines and gate lines (or nearly crossing portions in the case of the uppermost gate line), and a respective pixel capacitance CP arranged near switch, all the above elements being arranged over a glass substrate. The source lines extend in a column direction of the glass substrate. The liquid crystal gate lines GL extend in a row direction, and the pixels PXL are arranged in a matrix form (in columns and rows).

The gates of the thin film transistors QTFT of the pixels PXL arranged in the same row are coupled to the same liquid crystal gate line GL. Also, the sources of the thin film transistors QTFT of the pixels PXL arranged in the same column are coupled to the same liquid crystal source line SL. Moreover, one of the electrodes of each pixel capacitance CP in which a liquid crystal material is confined is coupled to a drain of the corresponding thin film transistor QTFT in each pixel PXL. A common potential line CL shared by all the pixels PXL is coupled to the other electrode of the pixel capacitance CP (common electrode).

When an address signal (gate output signal, output signal) VA is given to a desired liquid crystal gate line GL, a thin film transistor QTFT of the row is electrically conductive (on-state). A data signal (source output signal, output signal) VD given from the liquid crystal source line SL is written to the pixels PXL on the liquid crystal gate line GL. On the other hand, in the pixels PXL of the row to which an address signal VA is not given by the liquid crystal gate line GL, the thin film transistor QTFT is not electrically conductive (off-state). Therefore, the data already written remains held (stored).

In the pixel capacitance CP of each pixel PXL, a difference in grayscale (tone of color) is expressed by a potential difference between the two electrodes. If the thin film transistor QTFT is in an on-state, a potential of one electrode of the pixel capacitance CP is the same as that of the data signal VD supplied by the liquid crystal source line SL. At the other electrode, all the pixels PXL share the common potential line CL, and a common signal VC is transmitted to the common electrode as a reference potential for comparison.

In operation of the liquid crystal display DP, an address signal VA is sent to a liquid crystal gate line GL of a certain row. Then, a data signal VD sent from a liquid crystal source line SL in each column is written to the corresponding pixel PXL in the row. At the pixel PXL, a difference in grayscale of the pixel capacitance CP is represented by a potential difference between the common signal VC which is shared by all the pixels PXL and the data signal VD. One image screen is displayed when other liquid crystal gate lines GL are selected in order.

The LCD driver (driver circuit) DRV1 outputs the address signal VA to the selected liquid crystal gate line GL, the data signals (source output signal) VD to the liquid crystal source lines SL, and the common signal VC to the common potential line CL. An address signal input terminal TA is arranged over an extended line of each liquid crystal gate line GL, and a data signal input terminal TD is arranged over an extended line of each liquid crystal source line SL. Moreover, a common signal input terminal TC is arranged as a point for supplying common potential lines CL together. The input signals VA, VD, and VC from the LCD driver DRV1 are transmitted to respective signal lines GL, SL, and CL through the input terminals TA, TD, and TC.

Figure 3:
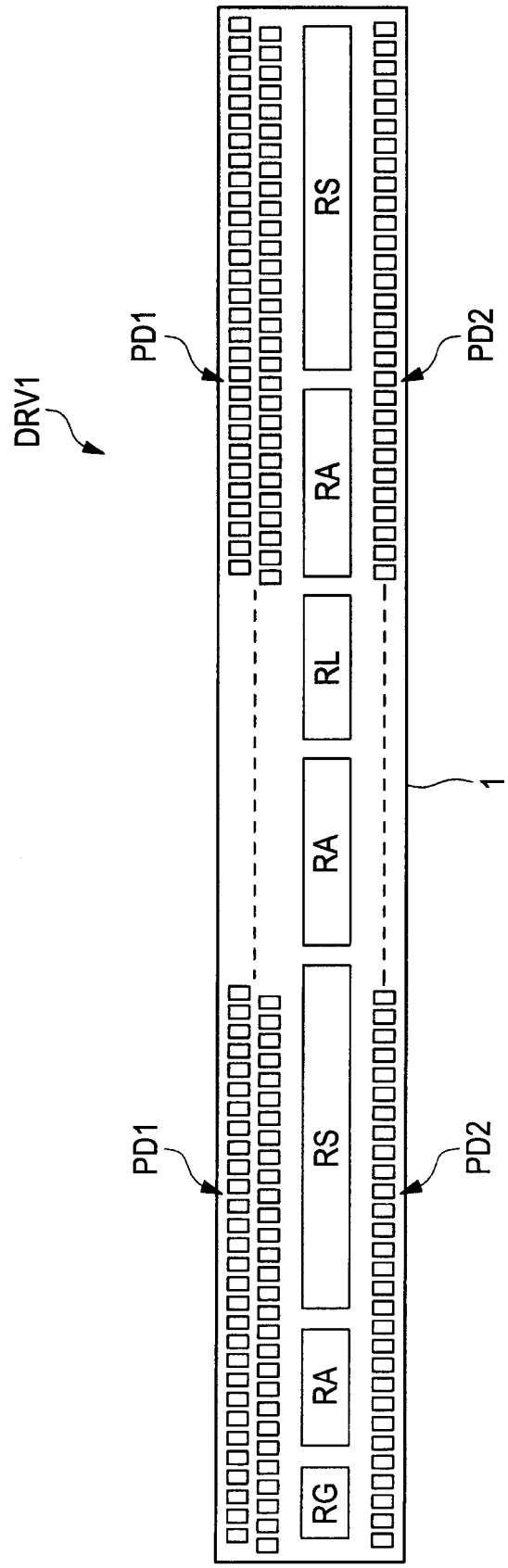
FIG. 3 is a plan view showing a principal part of the LCD driver of a semiconductor device according to Embodiment 1 of the present invention.

FIG. 3 is a plan view showing a principal part of the LCD driver DRV1 of Embodiment 1.

The LCD driver DRV1 is formed over a silicon substrate (semiconductor substrate) 1. Generally, the LCD driver DRV1 is mounted in the periphery of the liquid crystal display over a glass substrate. Therefore, the silicon substrate 1 where the LCD driver DRV1 is formed has a rectangular shape which is longer in a direction of one side. Also, it is arranged so as to allow its long side to be along a perimeter of the display. When expanding the liquid crystal display, the chip size of the LCD driver DRV1 is reduced. In this regard, it is effective to reduce it in a direction of a short side of the LCD driver DRV1 (reduction along the short side).

According to Embodiment 1, the long side direction of the LCD driver DRV1 is defined as a row direction (a first direction). The short side direction of the LCD driver DRV1 is defined as a column direction (a second direction). That is, the silicon substrate 1 which forms the LCD driver DRV1 has a rectangular shape which is longer in the row direction.

The LCD driver DRV1 has an output signal circuit region where a circuit for generating each of the above signals is arranged. More specifically, there are arranged a gate output circuit region RG and a source output circuit region (output circuit region) RS. The gate output circuit region RG is also called a "gate driver." Moreover, the source output circuit region RS is also called a "source driver" or a "segment driver." The gate output circuit region RG and the source output circuit region RS are circuits which generate the address signal VA and the data signal VD for displaying an image by time-division driving at the gate and source of the thin film transistor QTFT of the liquid crystal display DP explained in FIGS. 1 and 2. Detailed description will be given later of the configuration of the source output circuit region RS in the LCD driver DRV1 of Embodiment 1. In addition, there are arranged an analog circuit region RA for processing analog signals, a logic circuit region RL including a control circuit, a protection element forming region, a memory circuit region, a common output circuit region (each not shown), etc. The logic circuit region RL comprises various kinds of registers, a control circuit, etc. Moreover, there is formed, in the protection element forming region, a protection element (for example, a p-n junction diode etc.) for protecting the gate output circuit region RG and the source output circuit region RS from a positive and negative surge (electrostatic discharge).

There are arranged, over the LCD driver DRV1, plural output pads PD1 for receiving the address signals VA and the data signals VD which are generated in the above gate output circuit region RG, the source output circuit region RS, etc. and for sending them to the liquid crystal gate lines GL and the liquid crystal source lines SL (see FIGS. 1 and 2). The output pads PD1 are arranged preferably in rows along a long side of the silicon substrate 1 where the LCD driver DRV1 is formed. These output pads PD1 are for outputting the signals VA and VD to the liquid crystal display DP. When the LCD driver DRV1 is mounted over the glass substrate, it is preferable that the output pads PD1 are arranged closer to the liquid crystal display DP. Therefore, the output pads PD1 are disposed such that they are arranged along one of the two long sides of the silicon substrate 1 where the LCD driver DRV1 is formed, and that long side is opposed to the liquid crystal display DP side. The output pads PD1 are electrically coupled to the gate output circuit region RG and the source output circuit region RS through wires. Detailed description will be given later of the arrangement of the output pads PD1 and the configuration of coupling to the source output circuit region RS through wiring in the LCD driver DRV1 of Embodiment 1.

Along a long side of the substrate opposite to the side where the output pads PD1 are arranged, input pads PD2 are provided for inputting signals from an external control circuit etc.

Assuming, as an example, that the resolution of the liquid crystal display DP of FIG. 2 is 160×120 pixels of QQVGA (Quarter Quarter Video Graphics Array), then 160 liquid crystal gate lines GL and 120×3 (RGB) liquid crystal source lines SL are used. In such case, there are required 520 output pads PD1 to correspond to respective liquid crystal gate lines GL and respective liquid crystal source lines SL.

Figure 4:
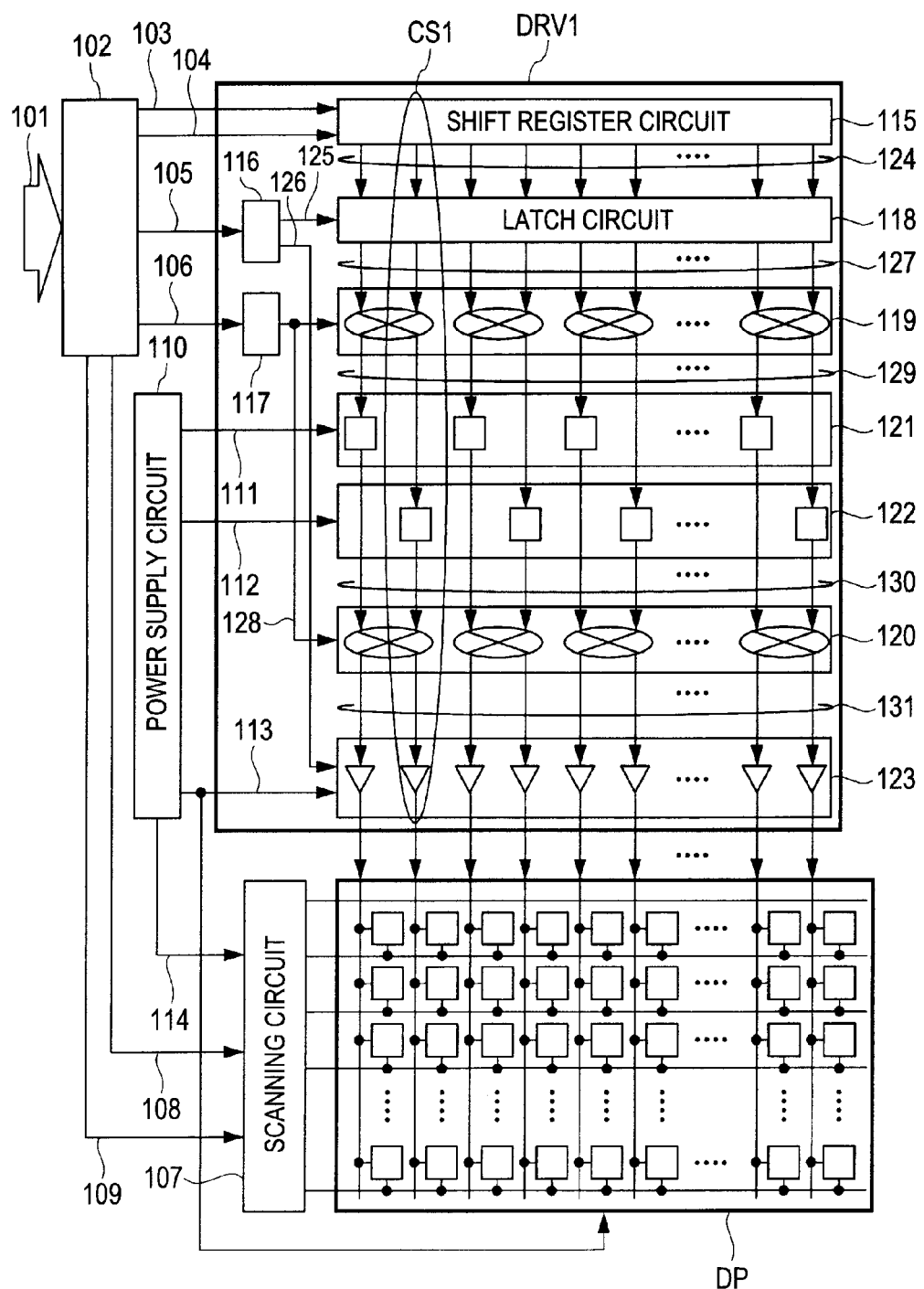
FIG. 4 is a block diagram showing a periphery of the LCD driver and the liquid crystal display according to Embodiment 1 of the present invention.

FIG. 4 is a block diagram showing the LCD driver DRV1 and the liquid crystal display DP according to Embodiment 1. A group of display signals 101 transferred from a system unit is sent to a liquid crystal controller 102. The liquid crystal controller 102 converts the group of display signals 101 to display data 103, data transmission clocks 104 in synchronism with the display data 103, a horizontal synchronization signal 105 which defines a horizontal period, and an alternating current signal 106 which defines alternating current timing of the liquid crystal drive, and transmits them to the LCD driver DRV1. Moreover, the liquid crystal controller 102 transmits, to a scanning circuit 107 which performs the selection in the order of lines of the liquid crystal display DP, a frame synchronization signal 108 which defines a period of the frame, and a scanning horizontal synchronization signal 109 which defines timing for the scanning horizontal period. Moreover, the power supply circuit 110 generates a positive grayscale reference voltage 111 in which the alternating current polarity of the liquid crystal drive voltage is positive, a negative grayscale reference voltage 112 which has a negative polarity, a common electrode voltage 113 which is a reference voltage of a common electrode of the liquid crystal display DP, and a scanning reference voltage 114 of the scanning drive voltage which the scanning circuit 107 outputs.

The LCD driver DRV1 comprises a shift register circuit 115, control circuits 116 and 117, a latch circuit 118, selection circuits 119 and 120, DAC circuits 121 and 122, and an output amplifier circuit 123.

The shift register circuit 115 sequentially takes in, one by one, display data 103 inside the LCD driver DRV1 and data transmission clocks 104, and outputs via display data bus 124 to the latch circuit 118. The control circuit 116 is a circuit which generates, from the horizontal synchronizing signal 105, as a timing signal inside the LCD driver DRV1, a horizontal latch signal 125 and an inverted timing signal 126. The horizontal latch signal 125 is also outputted to the latch circuit 118. Accordingly, the latch circuit 118 latches the display data of the display data bus 124 and outputs the output data 127.

The output data 127 from the latch circuit 118 is sent to the selection circuit 119. Moreover, the control circuit 117 generates a selection signal 128 from the alternating current signal 106 and transmits it to the selection circuit 119. Upon receipt of the output data 127 and the selection signal 128, the selection circuit 119 selects display data of an output terminal corresponding to an adjacent pixel and outputs the selected data 129. Upon receipt of the selected data 129, the DAC circuit 121 generates a positive grayscale voltage corresponding to the selected data 129. Also, the DAC circuit 122 generates a negative grayscale voltage corresponding to the selected data 129. Thus, each of the DAC circuits 121 and 122 generates a grayscale voltage 130.

The grayscale voltage 130 is sent to the selection circuit 120. Upon receipt of the grayscale voltage 130, the selection circuit 120 selects a grayscale voltage corresponding to an adjacent output terminal, and generates a selected grayscale voltage 131. The selected grayscale voltage 131 is amplified by the output amplifier circuit 123 and is outputted to the liquid crystal display DP.

The LCD driver DRV1 of Embodiment 1 sends the output signal to the liquid crystal display DP as described above.

With reference to FIGS. 1 to 3, the explanation is given such that the data signal VD is generated in the source output circuit region RS of the LCD driver DRV1 and that, through the output pad PD1, the data signal VD is sent to the liquid crystal source line SL of the liquid crystal display DP. In this regard, as described above, there are liquid crystal source lines SL corresponding to the number of columns in the liquid crystal display DP. Further, there are output pads PD1 corresponding to respective liquid crystal source lines SL, and it is necessary to generate different data signals VD individually. Therefore, the source output circuit region RS of the LCD driver DRV1 has individual circuit units for generating data signals VD corresponding to individual liquid crystal source lines SL. In this regard, the circuit unit is referred to as a "source output cell (output cell) CS1." The source output circuit region RS of the LCD driver DRV1 thus comprises two or more source output cells CS1 for generating the data signal VD to be sent to individual liquid crystal source lines SL. Also, individual output pads PD1 are assigned to the source output cells CS1. Therefore, as in the case of the output pads PD1, the source output cells CS1 are also arranged along the row direction in the source output circuit region RS. In one example of Embodiment 1, the source output cell CS1 comprises corresponding parts of shift register circuit 115, latch circuit 118, selection circuits 119 and 120, one of DAC circuits 121 and 122, and an output amplifier circuit 123 among the elements included in the LCD driver DRV1 shown in the block diagram of FIG. 4.

There are required the same number of the source output cells CS1, which are included in the source output circuit region RS in the LCD driver DRV1, as that of the liquid crystal source lines SL. In this regard, according to the studies conducted by the present inventors in advance, a method of arranging source output cells CSX in a source output circuit region RSX will be described with reference to FIGS. 14 and 15.

Figure 14:
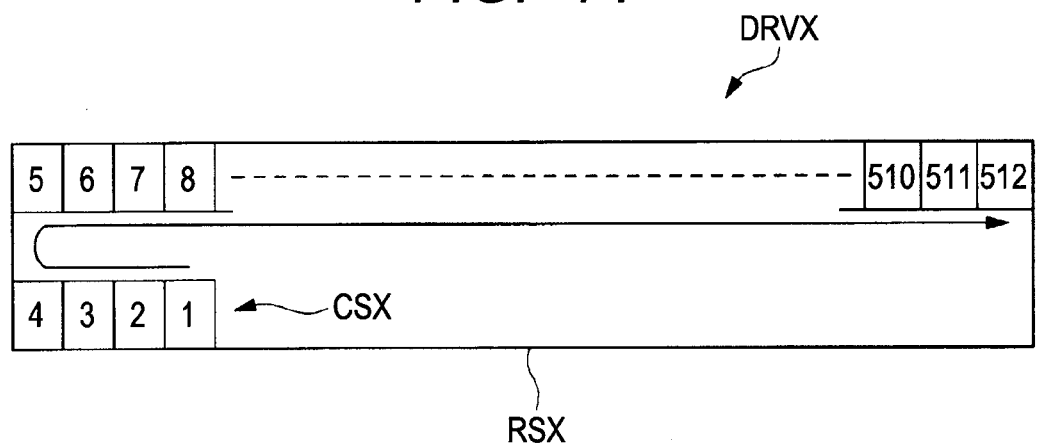
FIG. 14 is a diagram for explaining an LCD driver that the present inventors have studied in advance.

FIG. 14 is an explanatory view of the source output circuit region RSX of the LCD driver DRVX which the present inventors have examined in advance. FIG. 14 shows an example in which 512 source output cells CSX are arranged in the source output circuit region RSX. As described above, there are numbers of circuit regions provided over the LCD driver DRVX. Therefore, the regions where the source output circuit region RSX can be arranged are limited. With a technical trend in which miniaturization of the LCD driver DRVX is being called for, the region for arranging the source output circuit region RSX is going to be restricted further. On the other hand, the size of the source output cells CSX included in the source output circuit region RSX is determined by a manufacturing process margin and a manufacturing yield, and the reduction in size is limited. Furthermore, as the resolution of the liquid crystal display is increasing, the number of the source output cells CSX is also increasing. From this aspect, in the limited source output circuit region RSX, it can become difficult to arrange all the source output cells CSX in one row.

Therefore, as shown in FIG. 14, the present inventors examined the method of arrangement of the array of the source output cells CSX which is folded at the end portion. By folding part of the source output cells CSX arranged in sequence, the size requirement in the row direction imposed on the source mode output circuit region RSX can be satisfied. However, according to the further study by the present inventors, it was found that a problem arose in a method of wiring with the output pads.

Figure 15:
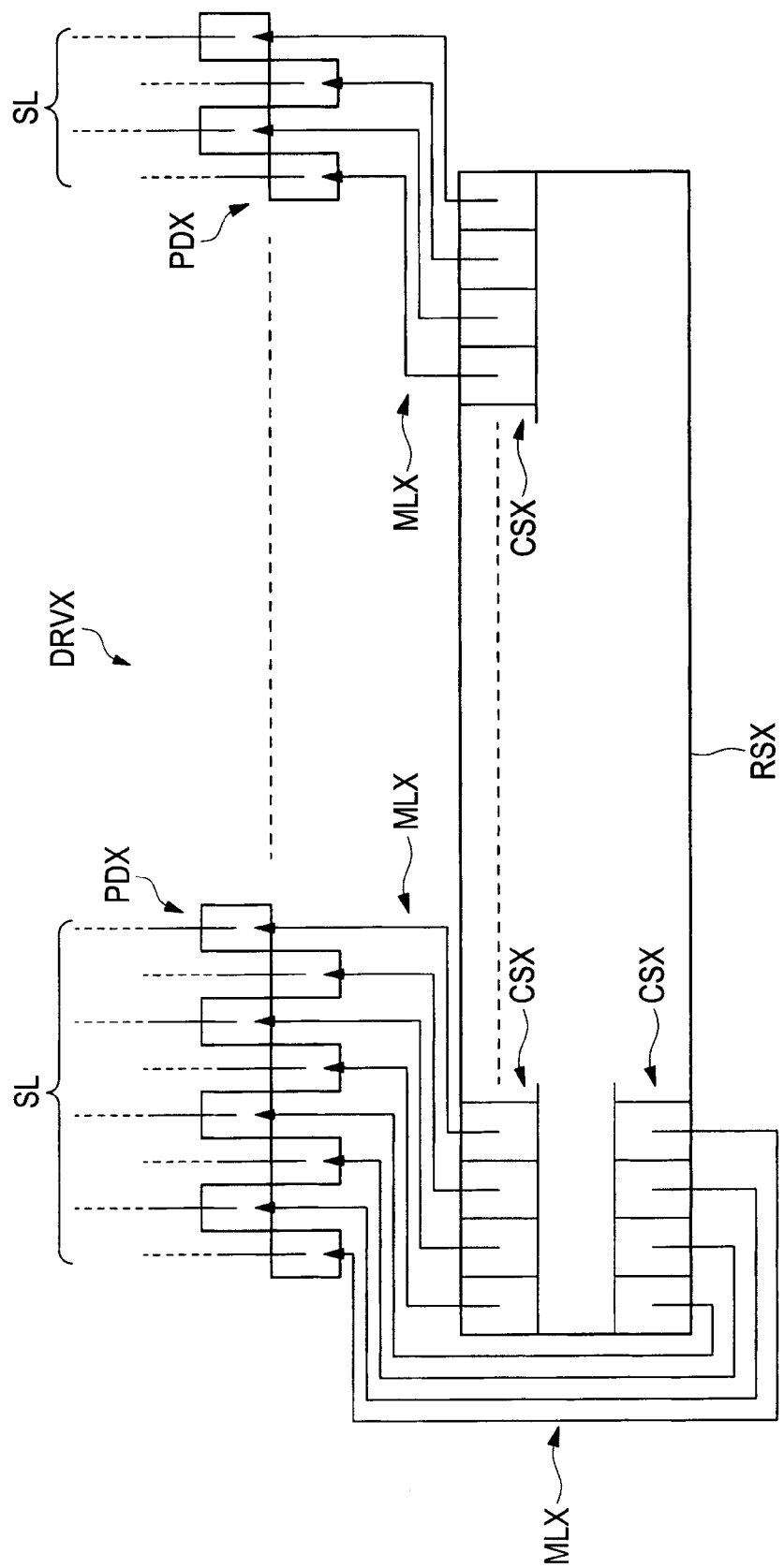
FIG. 15 is another diagram for explaining the LCD driver that the present inventors have studied in advance.

FIG. 15 is a diagram for explaining a state where the source output cells CSX and the output pads PDX are coupled by wires when the source output cells CSX are arranged as in FIG. 14. Each source output cell CSX is coupled with a corresponding output pad PDX through a wiring MLX. When the source output cells CSX are arranged with part thereof folded, there are formed two rows at the folded portion. In order to couple, using wires, the source output cells CSX arranged at a folded portion in the second row with the corresponding output pads PDX, the wiring MLX must be routed in the row direction. Therefore, even if the size in the row direction of the source output circuit region RSX is reduced by folding part of the array of the source output cells CSX, an increase in size arises as much as the amount of the wiring MLX routed in the row direction.

A cause for such a problem is that the source output cells CSX are arranged in the row direction in the same order as that of the corresponding output pads PDX and part of the end portion is folded. As described above, the output pads PDX are arranged corresponding to the liquid crystal source lines SL arranged in the row direction of liquid crystal display DP. Generally, according to the order corresponding to the liquid crystal source lines SL and the output pads PDX, the source output cells CSX are also arranged along the row direction. Therefore, when coupling, using wires, the source output cells CSX with the corresponding output pads PDX, the wirings MLX overlap at a portion where the two rows are formed at the end. In order to avoid this, it is necessary to route the wiring MLX in the row direction as in FIG. 15 or to arrange the design such that multi-layered wirings do not cross in the same layer.

Figure 5:
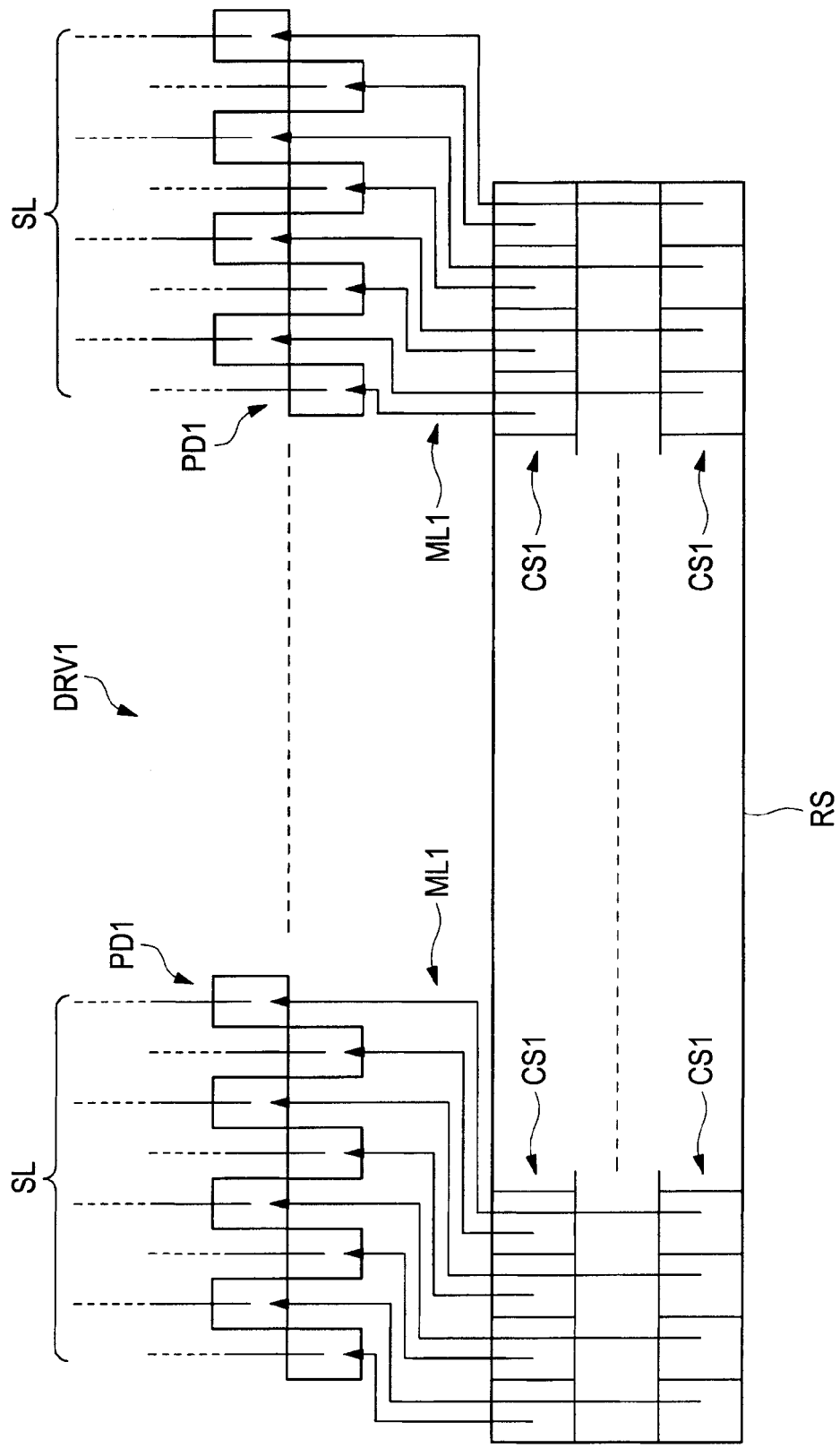
FIG. 5 is a diagram for explaining arrangements of source output cells and output pads in the LCD driver of the semiconductor device according to Embodiment 1 of the present invention.
Figure 6:
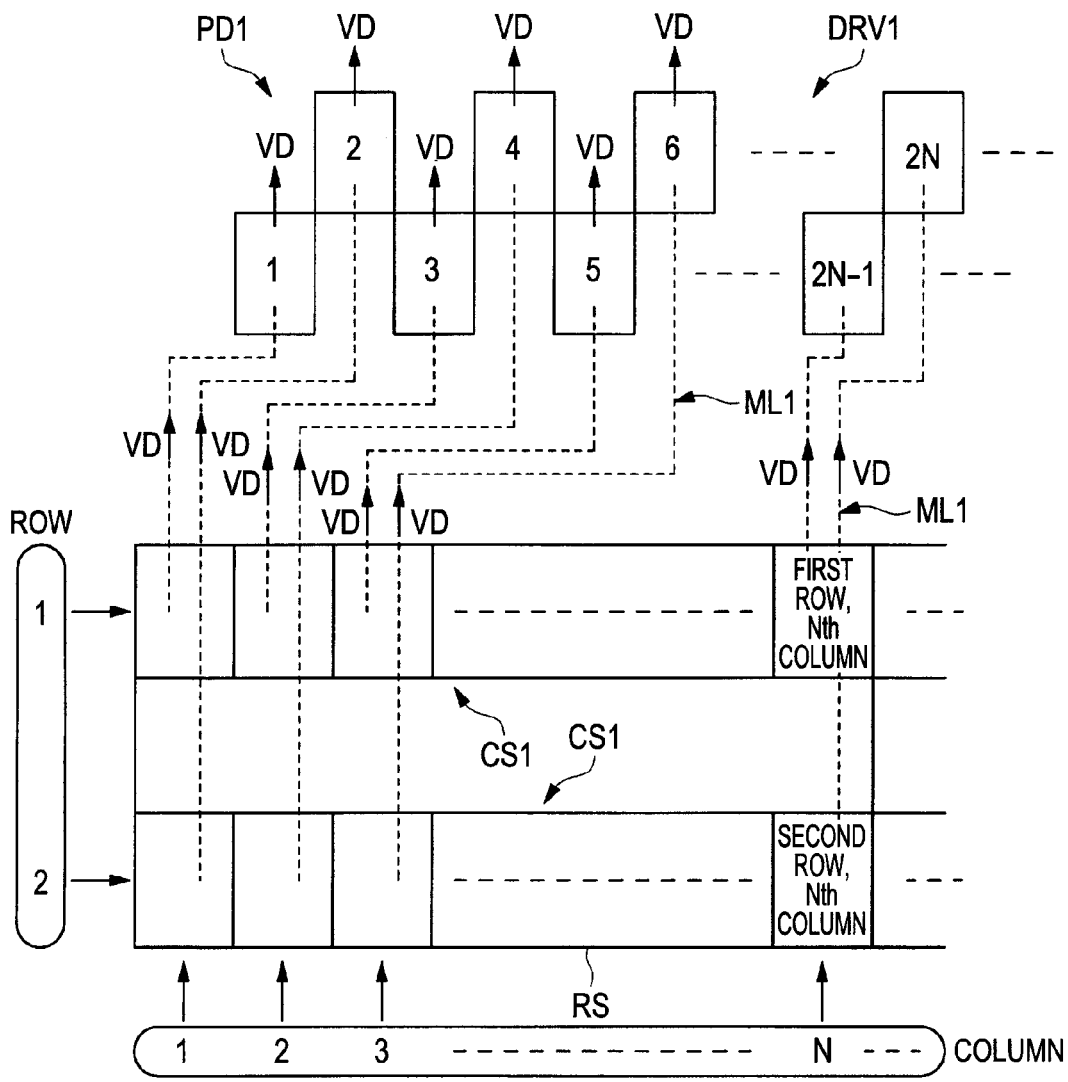
FIG. 6 is a diagram for explaining the array of source output cells and output pads in the LCD driver of FIG. 5.
Figure 7A:
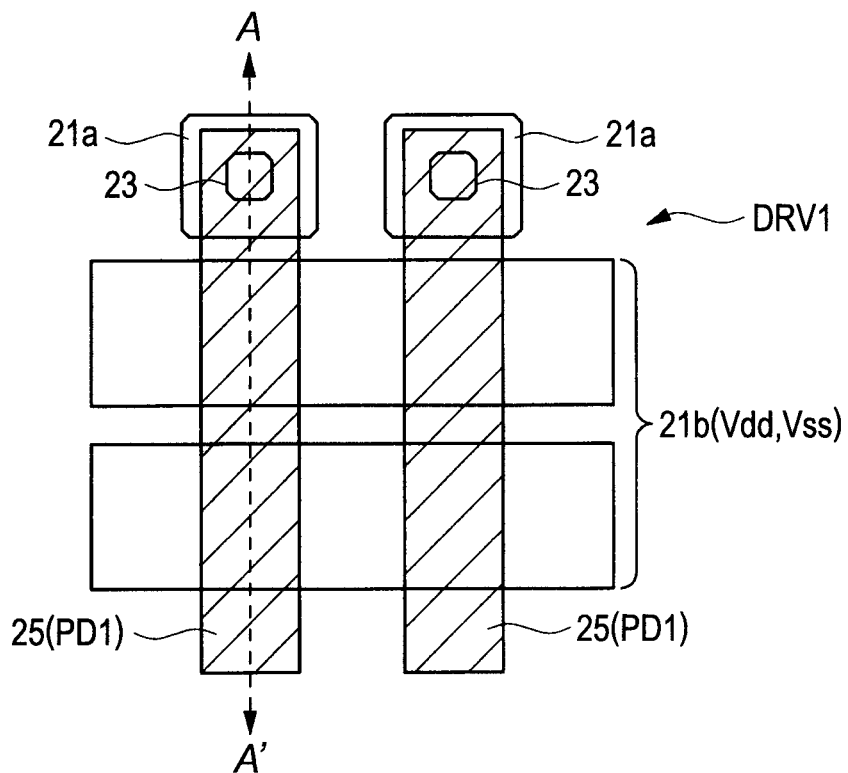
FIGS. 7(a) and 7(b) are plan views showing two examples of the output pads in the LCD driver of FIG. 5.
Figure 7B:
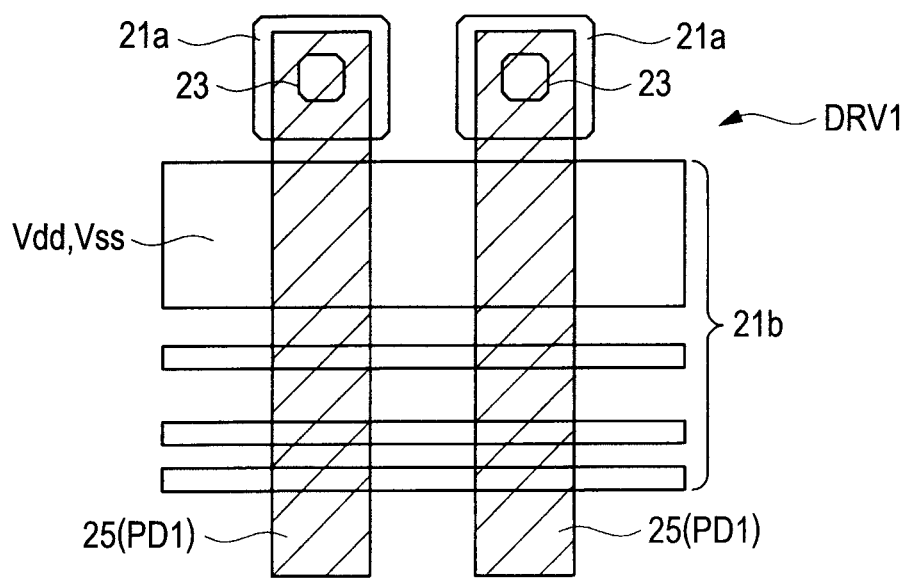
Figure 8:
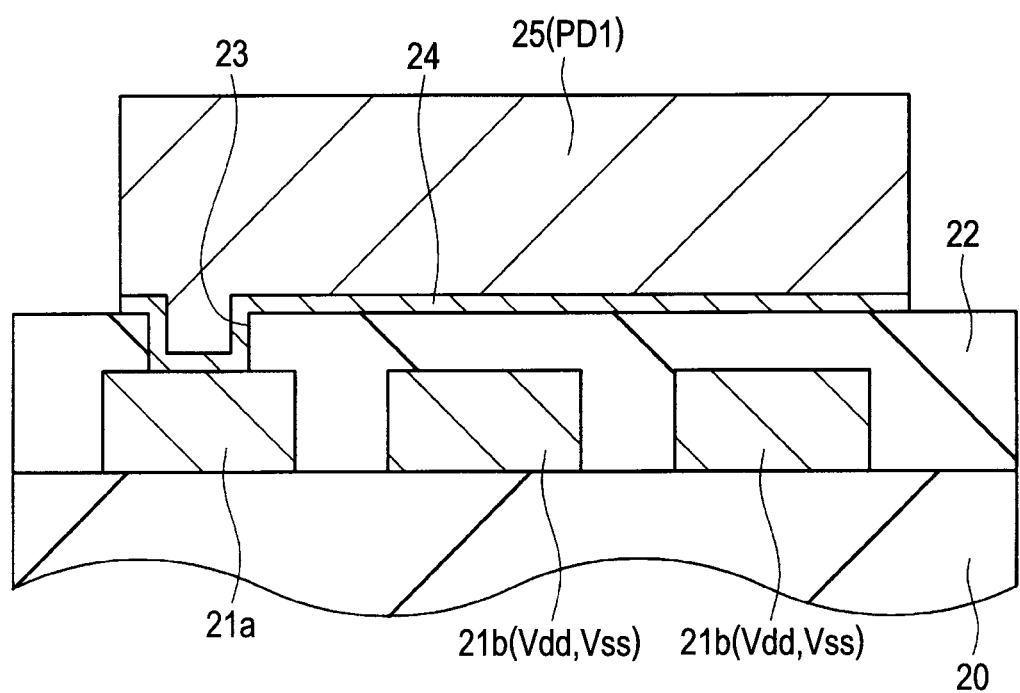
FIG. 8 is a cross-sectional view taken along line A-A' in FIG. 7(a)

With reference to FIGS. 5 to 8, a configuration which can be used in the LCD driver DRV1 to solve the above problem will be described. FIG. 5 is a diagram for explaining an arrangement of the source output cells (output cells) CS1 and the output pads PD1 in the LCD driver DRV1 of the semiconductor device of Embodiment 1. FIG. 6 is a diagram for explaining an arrangement of an array of the source output cells CS1 and the output pads PD1 in the LCD driver DRV1 of FIG. 5. FIG. 7 is an explanatory view showing output pads PD1 in the LCD driver DRV1 of FIG. 5. FIGS. 7(a) and 7(b) show two examples of the output-power pads PD1. FIG. 8 is a cross-sectional view taken along line A-A' of a plan view of FIG. 7(a).

First, with reference to FIGS. 7 and 8, the configuration of the output pads PD1 will be explained in detail. A metal pad 21a is formed over an interlayer insulating film 20 (see FIG. 8). The metal pad 21a and two or more wirings of an uppermost wiring layer 21b are formed in the same layer. The wirings 21b comprise two or more wirings, which are a power supply wiring Vdd, a reference power supply wiring Vss, a signal wiring, etc. In FIG. 7, each of the thick wirings in layer 21b is a power supply wiring Vdd or a reference power supply wiring Vss, which extends along a long side direction of the LCD driver DRV1. The metal pad 21a and the uppermost wiring layer 21b are covered with a surface protection film (protection film) 22. An opening 23 is formed in part of the surface protection film 22. The opening 23 is formed over the metal pad 21a. In the long side direction and short side direction of the LCD driver DRV1, the opening 23 is formed smaller than the size of the metal pad 21a. Over the surface protection film 22, there are formed an under bump metal film (Under Bump Metal: UBM) 24 and a bump 25. The under bump metal film 24 and the bump 25 are coupled to the metal pad 21a through the opening 23. Further, the under bump metal film 24 is not essential, and it serves the purpose if the bump 25 is formed over the surface protection film 22. Also, the same is true of the configuration of the input pad PD2 (see FIG. 3).

As shown in FIG. 7, the bump 25 is formed such that the size in the long side direction is larger than the size in the short side direction of the LCD driver DRV1. As a result, the wirings of uppermost wiring layer 21b can pass through the region under the bump 25, reducing the chip size. Moreover, in the direction of the long side of the LCD driver DRV1, the size of the bump 25 is set to be smaller than the size of the metal pad 21a. The reason is that, when forming the bump 25, it becomes easily flat if the metal pad 21a exists under it, improving the processing accuracy.

Description will be given assuming that the output pads PD1 shown in other drawings in Embodiment 1 generally indicate the bumps 25.

The material of the interlayer insulating film 20 includes, for example, a silicon oxide film, a silicon oxide film containing fluorine, etc. The metal pad 21a and the wirings 21b include, for example, a metal film containing aluminum as a principal component. Also, the surface protection film 22 includes, for example, a laminated film comprising a silicon oxide film and a silicon nitride film formed thereon. The under bump metal film 24 includes, for example, a single layer film of a titanium film, a nickel film, a palladium film, a titanium nitride film, or a gold film, or a laminated film thereof. The bump 25 includes, for example, a gold film.

As shown in FIGS. 5 and 6, in the LCD driver DRV1 of Embodiment 1, two or more source output cells CS1 are arranged along the row direction in an array of two rows and N columns. Since N shows a column number, it is a natural number (positive integer). Moreover, the source output cells CS1 are arranged in the two rows and N columns without space. Therefore, the total number of the source output cells CS1 can be expressed as (2N) in the case of an even number and as (2N−1) in the case of an odd number. In the present embodiment, it is assumed that the total number of the source output cells CS1 is 2N being an even number and the cells are arranged in the two rows and N columns.

Of the two or more source output cells CS1 arranged in the two rows and N columns, the source output cell CS1 of an Nth column of a first row is electrically coupled, through a wiring ML1, to an output pad PD1 arranged at a (2N−1)th position in the row direction of the two or more output pads PD1. Furthermore, of the two or more source output cells CS1 arranged in two rows and N columns, the source output cell CS1 of the Nth column of a second row is electrically coupled, through the wiring ML1, to a (2N)th output pad PD1 in the row direction of the two or more output pads PD1

In other words, the two or more output pads PD1 are deemed a first pad, a second pad, a third pad, and so on along the row direction. Further, the source output cells CS1 to be connected to respective output pads PD1 are similarly deemed a first cell, a second cell, a third cell, and so on. Then, a first source output cell CS1 is arranged in the first row, and a second source output cell CS1 is arranged in the second row and in the same column as the first source output cell CS1. Then, a third source output cell CS1 is arranged in a row next to the first source output cell CS1 in the first row. Further, a fourth source output cell CS1 is arranged in a column next to the second source output cell CS1 in the second row and in the same column as the third source output cell CS1 is arranged. Henceforth, the numbered source output cells CS1 are arranged similarly. Further, the source output cell CS1 and the output pad PD1 corresponding to the same number are electrically coupled through the wiring ML1.

In an arrangement according to the principles of FIGS. 5 and 6, the two or more output pads PD1 are deemed a first pad, a second pad, a third pad, and so on along the row direction sequentially. Further, the source output cells CS1 to be coupled with the above are deemed a first cell, a second cell, a third cell, and so on. Then, a source output cell CS1 of an odd number is arranged in the first row and a source output cell CS1 of an even number is arranged in the second row. However, as seen in the row direction, along the same direction both in the first and the second rows, the two or more source output cells CS1 are arranged such that the number of the source output cell CS1 increases. Then, the source output cell CS1 and the output pad PD1 corresponding to the same number are electrically coupled by the wiring ML1.

In other words, when the two or more output pads PD1 are deemed, along the row direction, sequentially, a first pad, a second pad, a third pad, and so on, the source output cell CS1 arranged in the first row is coupled to the output pad PD1 arranged as the odd-numbered output pad. Also, a source output cell CS1 arranged in the second row is coupled to the output pad PD1 as an even-numbered output pad. In particular, the source output cells CS1 of the first row are sequentially coupled to the output pads PD1 which are arranged at every other position such as the first pad, the third pad, the fifth pad, and so on. Similarly, the source output cells CS1 of the second row are coupled sequentially to the output pads PD1 arranged at every other position such as a second pad, a fourth pad, a six pad, and so on.

Thus, according to the LCD driver DRV1 Embodiment 1, the source output cells CS1 included in the source output circuit region RS1 are not arranged in the same order as that of the corresponding output pads PD1. That is, as described above, the odd-numbered cells and the even-numbered cells are arranged alternately. With the above configuration, as shown in FIGS. 5 and 6, the source output cells CS1 are coupled, using wiring, to the corresponding output pads PD1, without routing the wiring ML1 in the row direction in the manner required in FIG. 15. Therefore, according to the LCD driver of the semiconductor device of Embodiment 1, the chip size of the LCD driver can be reduced.

Furthermore, in the case of the above arrangement of the source output cells CS1, the wirings ML1 do not cross mutually. That is, the two or more wirings ML1 which couple the two or more output cells CS1 with the two or more pads PD1 can be configured such that they do not overlap with each other even when they are formed in one layer without employing a multilayer wiring.

FIGS. 5 and 6, etc. show that the output pads PD1 arranged along the row direction are arranged alternately. That is, the output pads PD1 are arranged in a zigzag fashion. To be specific, as seen in the row direction, the (2N−1)th output pad PD1 as seen in the row direction is arranged in a shifted manner in the row direction with respect to the (2N)th output pad PD1 as seen in the row direction. In general, over the output pad PD1, there is provided a bump being an external electrode. Therefore, because of the need for securing the bonding strength on bonding precision, or because of the requirements on the side of mounting the semiconductor chip, compared to the reduced sizes of other circuits and wirings forming the LCD driver DRV1, the size of the output pad PD1 itself cannot be sufficiently reduced. Accordingly, as described above, the output pads PD1 are arranged in a zigzag fashion so that the size margin is secured and, at the same time, the pitch between the output pads PD1 is kept small. As a result, such a configuration is achieved that the overall size can be easily reduced. In addition, the two or more output pads PD1 are not necessarily arranged in the zigzag fashion. Namely, the two or more output pads PD1 may be linearly arranged such that they are the first pad, the second pad, the third pad, and so on.

Embodiment 2

According to Embodiment 2, for the LCD driver DRV1 described in Embodiment 1, application to each drive method of the LCD will be explained.

Figure 9:
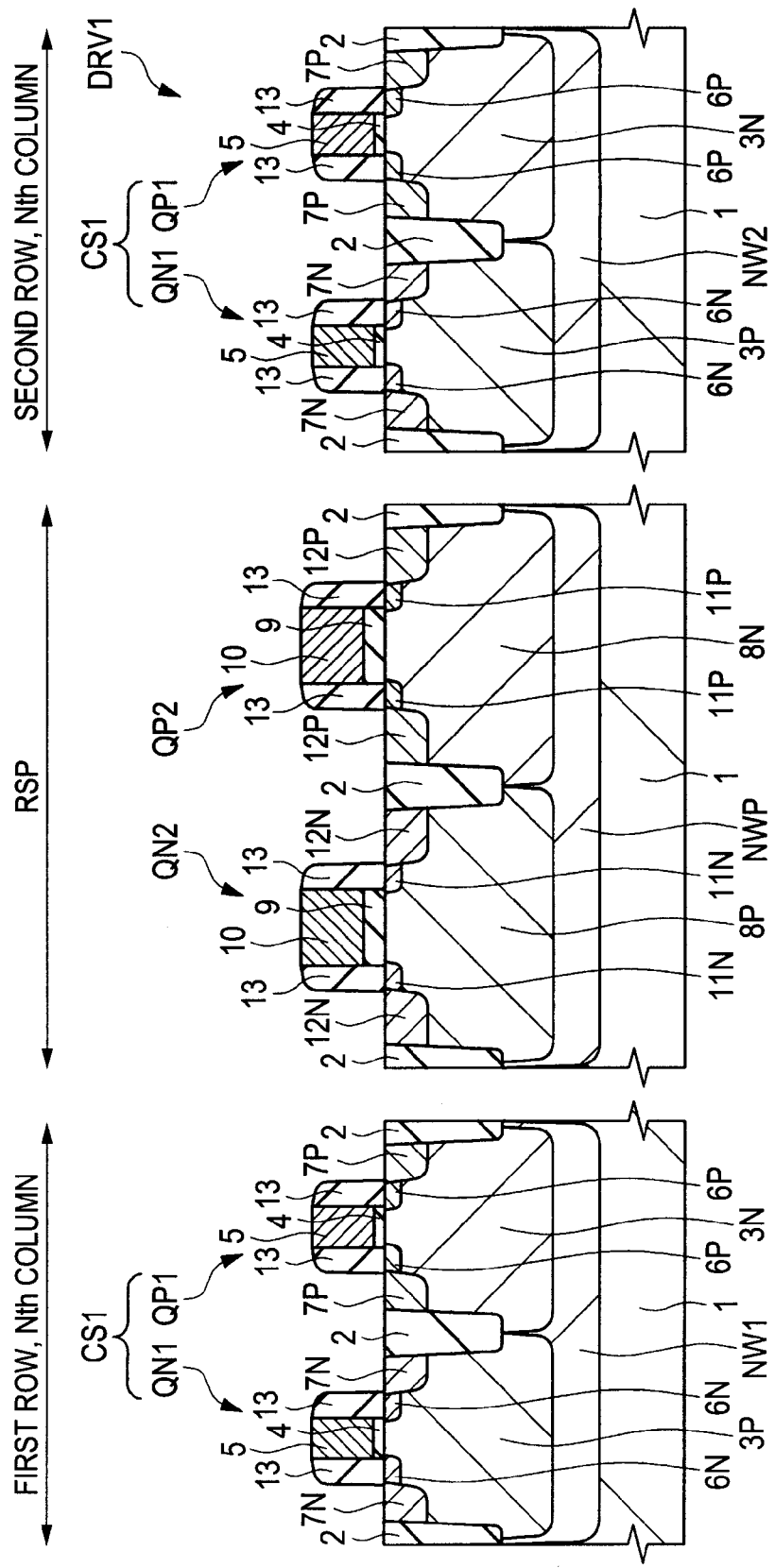
FIG. 9 shows cross-sectional views of principal parts of the LCD driver of a semiconductor device according to Embodiment 2 of the present invention.

Before describing each drive method, a detailed explanation will be given of two or more field-effect transistors (hereafter simply called "MIS transistors") of a MIS (Metal Insulator Semiconductor) type forming the two or more source output cells CS1 arranged in the source output circuit region RS. Each of the two or more source output cells CS1 arranged in the source output circuit region RS has a circuit configuration for generating a data signal VD. This circuit includes two or more MIS transistors etc. formed over a silicon substrate 1. In order to explain the configuration, FIG. 9 shows cross sections of principal parts of the source output circuit region RS in the LCD driver DRV1 of the semiconductor device in Embodiments 1 and 2. In the source output circuit region RS, shown on the left is a cross section of a principal part of the source output cell CS1 arranged at the Nth column of the first row. In the source output circuit region RS, shown on the right is a cross section of a principal part of the source output cell CS1 arranged at the Nth column of the second row. In the source output circuit region RS, shown in the center is a cross section of a principal part of a logic circuit region RSP. In the logic circuit region RSP, there are arranged other circuits (for example, a line latch etc.) of the source output cell CS1. In the regions, there are formed n-channel type MIS transistors (hereafter, simply called "n-type MIS transistors QN1 and QN2") in a region defined by a separators 2 being an insulating film mainly containing silicon oxide, and p-channel type MIS transistors (hereafter, simply called "p-type MIS transistors QP1 and QP2").

The source output cell CS1 arranged at the Nth column of the first row and the source output cell CS1 arranged at the Nth column of the second row have the similarly configured n-type MIS transistor QN1 and p-type MIS transistor QP1. The n-type MIS transistor QN1 included in the source output cell CS1 is formed in a p-well 3P, and has a gate electrode 5 formed over the silicon substrate 1 through a gate insulating film 4, and an n-type extension region 6N and an n-type diffusion region 7N which are formed in the p-well 3P in the lower and side portion thereof. The p-type MIS transistor QP1 included in the source output cell CS1 is formed in the n-well 3N, and has a gate electrode 5 formed over the silicon substrate 1 through the gate insulating film 4, and a p-type extension region 6P and a p-type diffusion region 7P formed in the n-well 3N in the lower and side portion. Further the n-type MIS transistor QN2 included in a circuit arranged in the logic circuit region RSP is formed in a p-well 8P, and has a gate electrode 10 formed over the silicon substrate through a gate insulating film 9, and an n-type extension region 11N and an n-type diffusion region 12N formed in the p-well 8P in the lower and side portion thereof. The p-type MIS transistor QP2 included in a circuit arranged in the logic circuit region RSP is formed in an n-well 8N and has the gate electrode 10 formed over the silicon substrate 1 through the gate insulating film 9, and a p-type extension region 11P and a p-type diffusion region 12P formed in the n-well 8N in the lower and side portion thereof. Moreover, sidewall spacers 13 are formed over side walls of the gate electrodes 5 and 10 included in the MIS transistors QN1, QN2, QP1, and QP2. The gate insulating films 4 and 9 and the sidewall spacers 13 are formed, for example, by an insulating film mainly containing silicon oxide. Moreover, the gate electrodes 5 and 10 are formed, for example, by an electrically conductive film containing polycrystalline silicon doped in a highly concentrated manner as a principal component.

In particular, in the source output circuit region RS of the LCD driver DRV1 according to Embodiments 1 and 2, the source output cell CS1 at the Nth column of the first row is arranged in a first common N-well (a first semiconductor region) NW1 formed over the silicon substrate 1 along the row direction. Moreover, a source output cell CS1 at the Nth column of the second row is arranged in a second common N-well (a second semiconductor region) NW2 formed over the silicon substrate 1 along the row direction. To put it another way, of the two or more source output cells CS1, the MIS transistors QN1 and QP1 included in cells which belong to the first row are arranged in the first common N-well NW1. Also, the MIS transistors QN1 and QP1 included in the cell which belongs to the second row are arranged in the second common N-well NW2. Further, the circuit arranged in the logic circuit region RSP is arranged in a common N-well NWP formed over the silicon substrate 1.

Each source output cell CS1 generates data signals VD byway of an integrated circuit including the MIS transistors QN1, QN2, QP1, QP2, etc.

Figure 10:
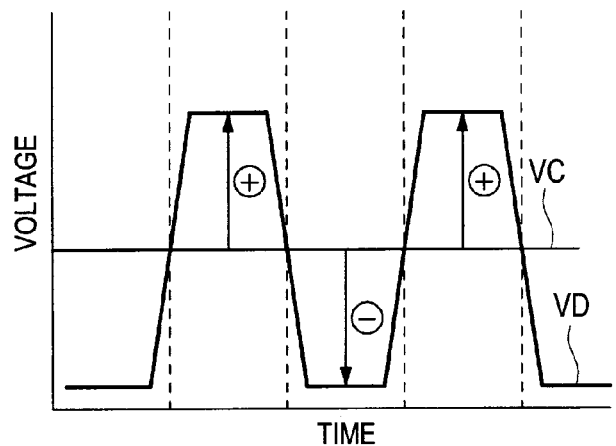
FIG. 10 is a graph showing a voltage condition in a drive method of Embodiment 2 of the present invention.
Figure 11:
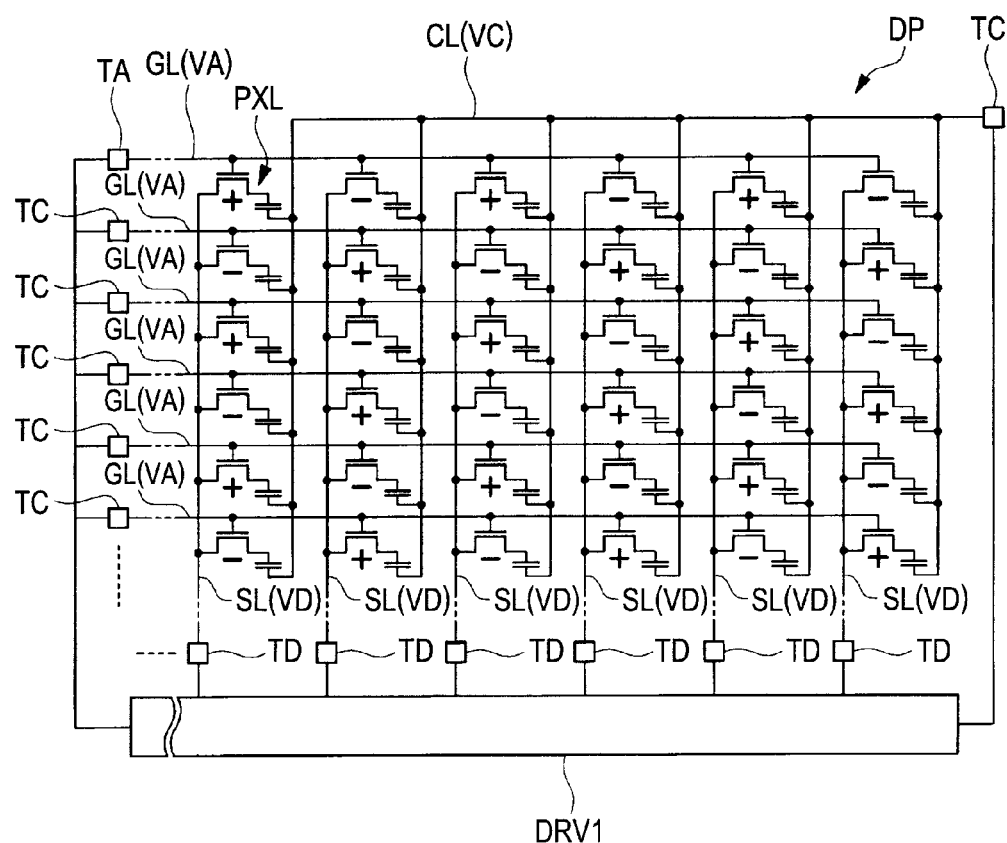
FIG. 11 is an explanatory view showing a liquid crystal display driven by the drive method of FIG. 10.

With reference to FIGS. 10 and 11, as a drive method of Embodiment 2, a dot inversion drive method will be explained. FIG. 10 is a graph showing a voltage condition in the dot inversion drive method. With respect to the common signal VC and the data signal VD described in FIGS. 1 and 2 etc., FIG. 10 shows change over time in the dot inversion method. FIG. 11 is an explanatory view showing an electric potential state of the liquid crystal display DP driven by the dot inversion drive method.

In the dot inversion drive method, a constant common signal VC which does not change over time is applied. The potential difference between the constant common signal VC and the data signal VD becomes the potential difference between two electrodes of the pixel capacitance CP in each pixel PXL. Burn-in of the screen is prevented by allowing the data signal VD to oscillate with lapse of time and allowing the positive and negative polarities of the potential difference with respect to the common signal VC to be reversed. In this regard, as disclosed in Patent Documents 3 and 4, it is known that the deterioration of the image quality can be reduced by employing the dot inversion drive method as a drive method of the liquid crystal display DP1.

According to a further study by the present inventors, as shown in FIG. 11, in the dot inversion drive method, the potential differences between the adjacent pixels PXL in the row direction are always reversed in terms of polarity. In the data signal VD supplied to the liquid crystal source line SL, the above means that the positive and negative polarities of the potentials to be supplied to the adjacent liquid crystal source lines SL are reversed. As shown in FIGS. 14 and 15, when the source output cells CSX are arranged according to the order corresponding to the order of the liquid crystal source lines SL, it is necessary for the adjacent source output cells CSX to output the data signals VD whose positive and negative polarities are reversed. In the adjacent source output cells CSX, the data signal VD whose positive and negative polarities are reversed must be applied to the well in which elements are arranged. This means that, in order to prevent short circuiting of respective circuits, the wells of the same conductive type must be isolated. As in FIGS. 14 and 15, according to the configuration that the present inventors have studied in advance, the source output cells CSX for sending the data signals VD to the adjacent liquid crystal source lines SL are arranged adjacently in the row direction. Therefore, to isolate the well in which the adjacent source output cells CSX are arranged means to enlarge the size in the row direction. That is, as a drive method for a liquid crystal display, when adopting the dot inversion drive method which can reduce the deterioration of the image quality, in the LCD driver DRVX of FIGS. 14 and 15 having the configuration that the present inventors have studied in advance, the size is enlarged in the row direction.

On the other hand, when the LCD driver DRV1 of Embodiments 1 and 2 is adopted, the dot inversion drive method of Embodiment 2 can be achieved without enlarging the size of the LCD driver DRV1 in the row direction. The reason is as follows. That is, as explained using FIGS. 5 and 6, in the LCD driver DRV1, the adjacent source output cells CS1 in the row direction are coupled alternately with respect to the liquid crystal source lines SL and the output pads PD1 arranged in the row direction. In the dot inversion drive method, as seen in FIG. 11, to the adjacent pixels PXL in the row direction, the source output signals VD having reversed polarities must be supplied. However, to the alternately arranged pixels PXL, it serves the purpose if the source output signals VD of the same polarities are supplied. Therefore, to the wells of the adjacent source output cells CS1 in the row direction, potentials having the same polarities are supplied.

Here, the adjacent source output cells CS1 in the row direction in the source output circuit region RS of the LCD driver DRV1 are the source output cells CS1 arranged in the same row. Further, to the well in which the source output cells CS1 of the same row are arranged, the potentials having the same polarities can be supplied. In other words, as explained in connection with FIG. 9, the source output cells CS1 to be arranged in the first row may be arranged in the same common N well NW1. Moreover, the source output cells CS1 to be arranged in the second row may be arranged in the same second common N-well NW2. Further, it will not be necessary to isolate the adjacent cells in the row direction. The reason is that the source output cell CS1 arranged at the Nth column of the first row and the source output cell CS1 arranged at the Nth column of the second row are the cells which supply the data signals VD to the adjacent liquid crystal source lines SL and that they are the cells which are not adjacent in the row direction but in the column direction.

From this aspect, in the dot inversion drive method of Embodiment 2, voltages having different polarities are applied to the first common N-well NW1 and the second common N-well NW2. Therefore, when applying the dot inversion drive method of Embodiment 2, the first common N-well NW1 and the second common N-well NW2 must be isolated. However, as described above, since they are adjacent wells in the column direction, they do not need to be expanded in the row direction where the size restriction is severe. Therefore, the chip size can be reduced in the LCD driver to which is applied a drive method that can suppress deterioration of the image quality.

When applying the dot inversion drive method of Embodiment 2, in the source output circuit region RS of the LCD driver DRV1, it is preferred that the logic circuit region RSP is arranged between the first common N-well NW1 and the second common N-well NW2. The reason is that, as described above, when adopting the dot inversion drive method of Embodiment 2, it is necessary to isolate the first common N-well NW1 from the second common N-well NW2. Therefore, by arranging the logic circuit region RSP in a region therebetween, a space can be effectively used. As a result, the chip size can be further reduced.

Figure 12:
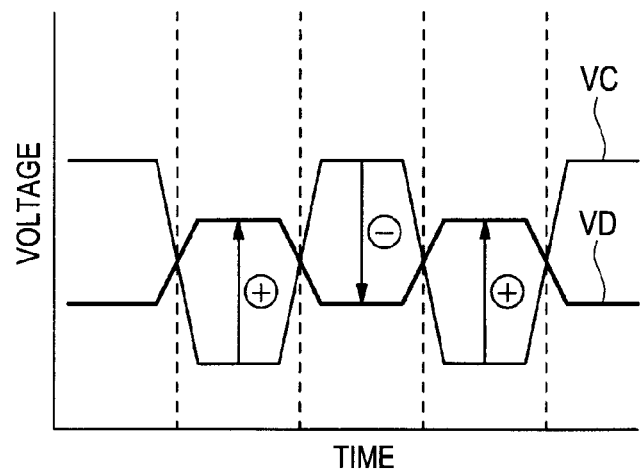
FIG. 12 is a graph showing a voltage condition in another drive method of Embodiment 2 of the present invention.
Figure 13:
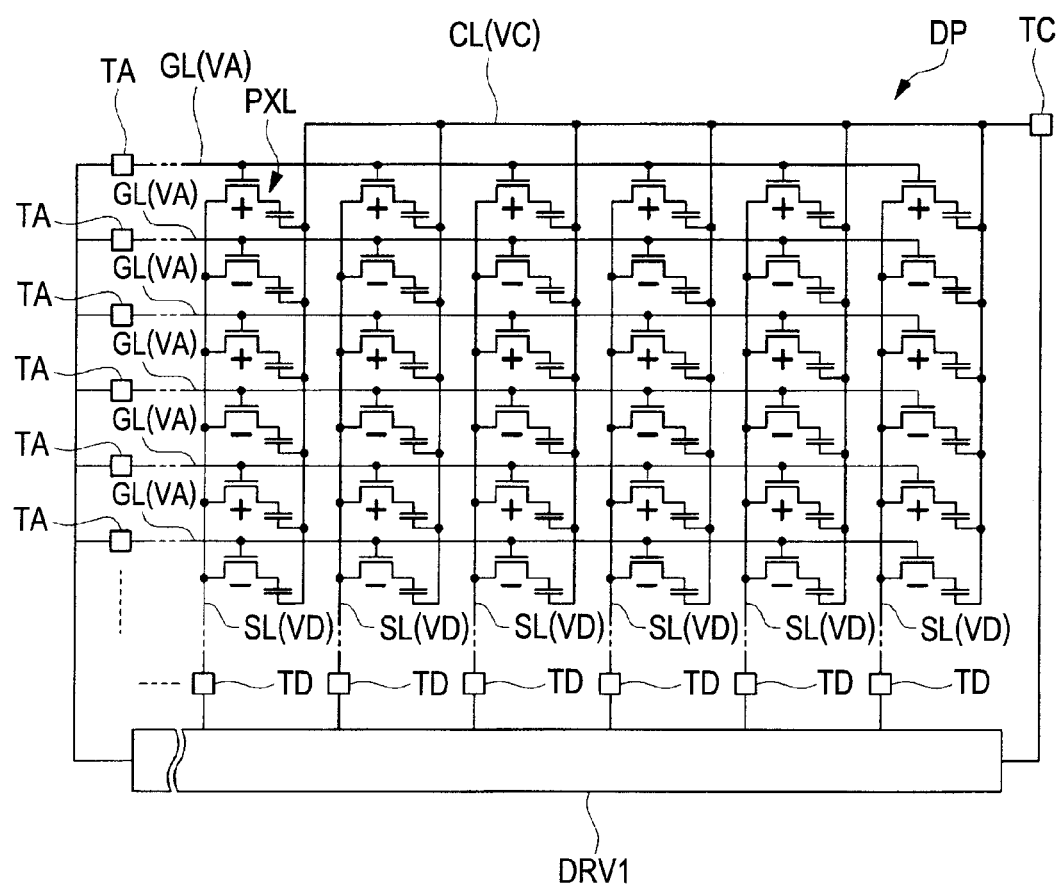
FIG. 13 is an explanatory view showing a liquid crystal display driven by the drive method of FIG. 12.

The LCD driver DRV1 according to Embodiments 1 and 2 is similarly effective when applied with other drive methods. With reference to FIGS. 12 and 13, as another drive method of Embodiment 2, a frame inversion drive method (also referred to as a "line inversion drive method") will be explained. FIG. 12 is a graph showing a voltage condition in the frame inversion drive method. FIG. 12 shows change over time in the frame inversion drive method with respect to the common signal VC and the data signal VD described with reference to FIGS. 1 and 2, etc. FIG. 13 is an explanatory view showing a potential state of the liquid crystal display DP driven by the frame inversion drive method.

In the frame inversion drive method, the common signal VC and the data signal VD oscillate at inverted phases with each other. The potential difference between them becomes a potential difference between the two electrodes of the pixel capacitance CP at each pixel PXL. The positive and negative polarities of the potential difference are inverted with the lapse of time, preventing the burn-in of the screen. According to the frame inversion drive method, the voltage amplitude of the data signal VD can be made smaller by using a relative potential difference between the common signal VC and the data signal VD oscillating with each other. As a result, power consumption can be reduced.

According to the further studies by the present inventors, as shown in FIG. 13, in the frame inversion drive method, the positive and negative polarities of the potential difference of the adjacent pixels PXL in the row direction are the same. This means that, in the data signal VD to be supplied to the liquid crystal source line SL, the positive and negative polarities of the potentials to be supplied to the adjacent liquid crystal source lines SL are the same. That is, the positive and negative polarities of the potentials of the adjacent liquid crystal source lines SL in the row direction are the same. Therefore, the positive and negative polarities of the potentials of the liquid crystal source lines SL to be alternately arranged in the row direction are also the same. Therefore, as described above, the LCD driver DRV1, where adjacent source output cells CS1 in the row direction are alternately coupled with respect to the liquid crystal source lines SL and the output pads PD1 arranged in the row direction, is similarly effective even when applied to the frame inversion drive method. In other words, in the frame inversion drive method, the positive and negative polarities of the data signals VD supplied by the adjacent source output cells CS1 in the row direction (corresponding to the liquid crystal source lines SL and output pads PD1 alternately arranged in the row direction) are the same. Therefore, all the source output cells CS1 of the first row may be arranged in the same first common N-well NW1. Similarly, all the source output cells CS1 of the second row may be arranged in the same second common N-well NW2.

Further, according to the frame inversion drive method, also to the adjacent liquid crystal source lines SL and output pads PD1 in the row direction, the source output signals VD of the same polarities are supplied. Therefore, voltages having the same polarities are applied to the first common N-well NW1 and the second common N-well NW2. Thus, with the frame inversion drive method, a spacing between the first common N-well NW1 and the second common N-well NW2 can also be set without concern about the short-circuiting between the wells.

Although specific explanations have been given of the invention based on the embodiments as described above, the invention is not limited to the embodiments but can naturally be changed variously in keeping with the principles described herein.

The present invention can be widely applied in the industry where semiconductor devices having LCD drivers are manufactured.

What is claimed is:

1. A semiconductor device having a driver circuit formed over a semiconductor substrate, said driver circuit comprising:
   an output circuit region;
   two or more output cells arranged in said output circuit region and generating output signals; and
   two or more output pads receiving said output signals and sending them to the outside,
   wherein said two or more output pads are arranged along a row direction of said semiconductor substrate,
   wherein said two or more output cells are arranged in two rows and N columns along said row direction,
   wherein the output cell arranged at an Nth column of a first row is electrically coupled to the output pad arranged at a (2N−1)th position in said row direction, and
   wherein the output cell arranged at the Nth column of a second row is electrically coupled to the output pad arranged at a (2N)th position in said row direction
   wherein said driver circuit is an LCD driver which drives a liquid crystal display unit,
   wherein said output signals generated by said output cells are source output signals to be sent to pixels included in said liquid crystal display unit,
   wherein said semiconductor substrate has a rectangular shape which is longer in said row direction,
   wherein said two or more pads are arranged over said semiconductor substrate along a long side of said semiconductor substrate,
   wherein said two or more pads are electrically coupled to source lines of the pixels included in said liquid crystal display unit,
   wherein the output cell at the Nth column of said first row is arranged in a first semiconductor region formed along said row direction in said semiconductor substrate,
   wherein the output cell at the Nth column of said second row is arranged in a second semiconductor region formed along said row direction in said semiconductor substrate,
   wherein voltages having different polarities are applied to said first semiconductor region and said second semiconductor region,
   wherein said driver circuit has logic circuit region, and
   wherein, in said semiconductor substrate, said logic circuit region is arranged between said first semiconductor region and said second semiconductor region.

2. A semiconductor device according to claim 1, wherein two or more wirings for coupling said two or more output cells with said two or more output pads are formed in one wiring layer.

3. A semiconductor device according to claim 2, wherein the output pad at the (2N−1)th position in said row direction and the output pad at the (2N)th position in said row direction are arranged in a shifted manner in a column direction.

4. A semiconductor device according to claim 2, wherein said two or more output pads are arranged linearly along said row direction.

5. A semiconductor device according to claim 1, said driver circuit further comprising:
   an uppermost wiring layer formed over said semiconductor substrate;
   metal pads in the same layer as said uppermost wiring layer;
   a protection film formed over said uppermost wiring layer and said metal pads and having respective openings over said metal pads; and
   bumps formed over said protection film and coupled to said metal pads through said openings, respectively,
   wherein each of said two or more output pads is constituted by a respective one of said bumps.

6. A semiconductor device according to claim 1,
   wherein the output cell at the Nth column of said first row is arranged in a first semiconductor region formed along said row direction in said semiconductor substrate, and
   wherein the output cell at the Nth column of said second row is arranged in a second semiconductor region formed along said row direction in said semiconductor substrate.

7. A semiconductor device according to claim 6, wherein two or more wirings for coupling said two or more output cells with said two or more output pads are formed in one wiring layer.

8. A semiconductor device according to claim 7, wherein the output pad at the (2N−1)th position in said row direction and the output pad at the (2N)th position in said row direction are arranged in a shifted manner in said column direction.

9. A semiconductor device according to claim 7, wherein said two or more output pads are arranged linearly along said row direction.

10. A semiconductor device according to claim 6, said driver circuit further comprising:
    an uppermost wiring layer formed over said semiconductor substrate;
    metal pads formed in the same layer as said uppermost wiring layer;
    a protection film formed over said uppermost wiring layer and said metal pads and having respective openings over said metal pads; and
    bumps formed over said protection film and coupled to said metal pads through said openings, respectively,
    wherein each of said two or more output pads is constituted by a respective one of said bumps.

11. A semiconductor device according to claim 6, wherein voltages of a same polarity are applied to said first and second semiconductor regions.

12. A semiconductor device according to claim 6, wherein voltages of different polarities are applied to said first and second semiconductor regions.

* * * * *